United States Patent
Shao et al.

(10) Patent No.: US 12,257,708 B2
(45) Date of Patent: Mar. 25, 2025

(54) ROBOTIC ARM CALIBRATION METHOD

(71) Applicant: Delta Electronics, Inc., Taoyuan (TW)

(72) Inventors: Chi-Huan Shao, Taoyuan (TW);
Chih-Ming Hsu, Taoyuan (TW);
Chi-Shun Chang, Taoyuan (TW);
Hung-Sheng Chang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 18/406,640

(22) Filed: Jan. 8, 2024

(65) Prior Publication Data

US 2024/0139935 A1     May 2, 2024

Related U.S. Application Data

(62) Division of application No. 17/024,106, filed on Sep. 17, 2020, now Pat. No. 11,904,464.

(30) Foreign Application Priority Data

Dec. 3, 2019 (CN) .......................... 201911217374.8

(51) Int. Cl.
*B25J 9/02*     (2006.01)
*G01B 5/00*     (2006.01)
*G01B 5/004*     (2006.01)

(52) U.S. Cl.
CPC .............. *B25J 9/02* (2013.01); *G01B 5/0021* (2013.01); *G01B 5/004* (2013.01)

(58) Field of Classification Search
CPC ......... B25J 9/02; B25J 9/1692; G01B 5/0021; G01B 5/004; G01B 21/042; G01B 21/045;

(Continued)

(56) References Cited

U.S. PATENT DOCUMENTS 5,053,976 A * 10/1991 Nose ...................... B25J 9/1607
                                                   901/3
6,317,699 B1    11/2001   Watanabe et al.
(Continued)

FOREIGN PATENT DOCUMENTS

CN     106808483 A     6/2017
CN     107042528 A     8/2017
(Continued)

*Primary Examiner* — Tung S Lau
(74) *Attorney, Agent, or Firm* — KIRTON McCONKIE; Evan R. Witt

(57) ABSTRACT

A three-dimensional measuring device includes a ball-shaped structure, an X-axis measuring module, a Y-axis measuring module and a Z-axis measuring module. The ball-shaped structure is moved and/or rotated in response to a movement of a movable object. The X-axis measuring module includes a first measuring structure and a first position sensor. The first measuring structure is movable along an X-axis direction and contacted with the ball-shaped structure. The Y-axis measuring module includes a second measuring structure and a second position sensor. The second measuring structure is movable along a Y-axis direction and contacted with the ball-shaped structure. The Z-axis measuring module includes a third measuring structure and a third position sensor. The third measuring structure is movable along a Z-axis direction and contacted with the ball-shaped structure.

4 Claims, 6 Drawing Sheets

(58) Field of Classification Search
CPC .......... G05B 2219/39019; G05B 2219/39021; G05B 2219/39024
See application file for complete search history.

(56) References Cited

U.S. PATENT DOCUMENTS

| | | | |
|---|---|---|---|
| 7,386,408 B2* | 6/2008 | Nishibashi | B25J 9/1692 |
| | | | 901/17 |
| 7,904,202 B2 | 3/2011 | Hoppe | |
| 10,065,319 B2 | 9/2018 | Huang et al. | |
| 10,882,189 B2* | 1/2021 | Matsuura | B25J 13/06 |
| 10,917,543 B2* | 2/2021 | Ramirez Luna | A61B 90/25 |
| 11,091,211 B1* | 8/2021 | Ebrahimi Afrouzi | B62D 63/02 |
| 11,336,804 B2* | 5/2022 | Luna | B25J 9/0009 |
| 11,345,040 B2* | 5/2022 | Oleynik | G05B 19/4183 |
| 11,904,464 B2* | 2/2024 | Shao | B25J 9/02 |
| 2008/0046122 A1* | 2/2008 | Manzo | A61B 90/98 |
| | | | 700/245 |
| 2009/0088775 A1* | 4/2009 | Swarup | A61B 34/71 |
| | | | 700/264 |
| 2010/0111370 A1 | 5/2010 | Black et al. | |
| 2019/0381668 A1 | 12/2019 | Huang et al. | |
| 2020/0261297 A1* | 8/2020 | Strydom | A61G 13/0081 |
| 2021/0387350 A1* | 12/2021 | Oleynik | A47J 44/00 |
| 2022/0370160 A1* | 11/2022 | Basafa | A61B 34/37 |

FOREIGN PATENT DOCUMENTS

| | | | | |
|---|---|---|---|---|
| CN | 107263463 A | 10/2017 | | |
| CN | 108582047 A | 9/2018 | | |
| CN | 109986558 A | 7/2019 | | |
| TW | 1579123 B | 4/2017 | | |
| TW | 1601611 B | 10/2017 | | |
| WO | WO 2022159887 A1 * | 7/2022 | ......... | A61M 37/0076 |
| WO | WO 2022199059 A1 * | 9/2022 | ............. | B25J 13/00 |

* cited by examiner

ROBOTIC ARM CALIBRATION METHOD

CROSS-REFERENCE TO RELATED APPLICATION

This application is a Divisional Application of U.S. patent application Ser. No. 17/024,106 filed on Sep. 17, 2020 and entitled "THREE-DIMENSIONAL MEASURING DEVICE AND ROBOTIC ARM CALIBRATION METHOD THEREOF", which claims the priority to Chinese Patent Application No. 201911217374.8 filed on Dec. 3, 2019. The entire contents of the above-mentioned patent applications are incorporated herein by reference for all purposes.

FIELD OF THE INVENTION

The present disclosure relates to a measuring device, and more particularly to a three-dimensional measuring device and a robotic arm calibration method thereof.

BACKGROUND OF THE INVENTION

With the advancement of industrial technology, a wide variety of automatic devices have been extensively developed for use in lives and industries. Generally, a robotic arm is an important component of an automation device. Although the processing stability of the robotic arm is much higher than the manual processing stability, there are still some drawbacks. For example, the robotic arm has many joints. Because of the accumulation and transmission of multiple errors, the precision of the robotic arm is not high. For increasing the precision of the robotic arm, a measuring device is used to calibrate the robotic arm before the robotic arm performs the processing task. At present, the commonly measuring devices include laser interferometers and laser trackers. Generally, the laser interferometer can measure one axis of errors at a time. For measuring the errors of different items, it is necessary to change the lens groups. Consequently, the operation of the laser interferometer is time-consuming. The use of the laser tracker can quickly acquire the detection result at high precision. However, the laser tracker is not cost-effective.

Therefore, there is a need of providing a three-dimensional measuring device and a robotic arm calibration method for simultaneously measuring the moving distances of an object in three dimensions and providing the robotic arm calibration parameters so as to address the issues encountered by the prior arts.

SUMMARY OF THE INVENTION

An object of the present disclosure provides a three-dimensional measuring device. The three-dimensional measuring device includes a ball-shaped structure, an X-axis measuring module, a Y-axis measuring module and a Z-axis measuring module. The ball-shaped structure is contacted with the X-axis measuring module, the Y-axis measuring module and the Z-axis measuring module and assembled with a movable object. Consequently, the three-dimensional measuring device can measure the three-dimensional coordinate of the ball-shaped structure to acquire the working point of the movable object. The use of the three-dimensional measuring device can save the measuring time period and reduce the fabricating cost.

Another object of the present disclosure provides a robotic arm calibration method. The robotic arm calibration method is implemented by the three-dimensional measuring device of the present disclosure and has the time-saving and cost-effective efficacy.

In accordance with an aspect of the present disclosure, a three-dimensional measuring device is provided. The three-dimensional measuring device is connected with a movable object of an automation device. The three-dimensional measuring device includes a ball-shaped structure, a base, an X-axis measuring module, a Y-axis measuring module and a Z-axis measuring module. The ball-shaped structure is assembled with the movable object. The ball-shaped structure is moved and/or rotated in response to a movement of the movable object. The X-axis measuring module is disposed on the base, and includes a first measuring structure and a first position sensor. The first measuring structure is movable along an X-axis direction and contacted with the ball-shaped structure. When the first measuring structure is pushed by the ball-shaped structure, the first position sensor measures a displacement amount of the first measuring structure. The Y-axis measuring module is disposed on the base, and includes a second measuring structure and a second position sensor. The second measuring structure is movable along a Y-axis direction and contacted with the ball-shaped structure. When the second measuring structure is pushed by the ball-shaped structure, the second position sensor measures a displacement amount of the second measuring structure. The Z-axis measuring module is disposed on the base, and includes a third measuring structure and a third position sensor. The third measuring structure is movable along a Z-axis direction and contacted with the ball-shaped structure. When the third measuring structure is pushed by the ball-shaped structure, the third position sensor measures a displacement amount of the third measuring structure. A measuring space is defined by a movable distance range of the first measuring structure along the X-axis direction, a movable distance range of the second measuring structure along the Y-axis direction and a movable distance range of the third measuring structure along the Z-axis direction. When the ball-shaped structure is moved in the measuring space, a three-dimensional coordinate of the ball-shaped structure is obtained according to sensed results of the first position sensor, the second position sensor and the third position sensor.

In accordance with another aspect of present disclosure, a robotic arm calibration method is provided. The robotic arm calibration method includes the following steps. In a step (S1), a three-dimensional measuring device and a robotic arm are provided. The three-dimensional measuring device includes a ball-shaped structure, a base, an X-axis measuring module, a Y-axis measuring module and a Z-axis measuring module. The ball-shaped structure is assembled with the robotic arm, the ball-shaped structure is moved and/or rotated in response to a movement of the robotic arm. The X-axis measuring module is disposed on the base and includes a first measuring structure and a first position sensor. The first measuring structure is movable along an X-axis direction and contacted with the ball-shaped structure. The first position sensor measures a displacement amount of the first measuring structure when the first measuring structure is pushed by the ball-shaped structure. The Y-axis measuring module is disposed on the base and includes a second measuring structure and a second position sensor. The second measuring structure is movable along a Y-axis direction and contacted with the ball-shaped structure. The second position sensor measures a displacement amount of the second measuring structure when the second measuring structure is pushed by the ball-shaped structure.

The Z-axis measuring module is disposed on the base and includes a third measuring structure and a third position sensor. The third measuring structure is movable along a Z-axis direction and contacted with the ball-shaped structure. The third position sensor measures a displacement amount of the third measuring structure when the third measuring structure is pushed by the ball-shaped structure. A measuring space is defined by a movable distance range of the first measuring structure along the X-axis direction. A movable distance range of the second measuring structure along the Y-axis direction and a movable distance range of the third measuring structure along the Z-axis direction. When the ball-shaped structure is moved in the measuring space, a three-dimensional coordinate of the ball-shaped structure is obtained according to sensed results of the first position sensor, the second position sensor and the third position sensor. In a step (S2), at least one preset positioning point in the measuring space is measured. In a step (S3), the robotic arm is controlled to be moved from an initial point toward the same preset positioning point with different operation actions for more than two times, and a three-dimensional coordinate of each actual positioning point of the robotic arm at each time is acquired according to the three-dimensional coordinate of the ball-shaped structure measured by the three-dimensional measuring device. In a step (S4), a function equation about each actual positioning point in each operation action of the robotic arm in the step (S3) is calculated according to the forward kinematics, and a predicted positioning point of the robotic arm in each operation action is acquired according to the function equation. Then, a step (S5) is performed to judge whether a difference between the predicted positioning points of the robotic arm in every two different operation actions minus a difference between the actual positioning points of the robotic arm in every two different operation actions is within an acceptable threshold range; if the difference between the two predicted positioning points minus the difference between the two actual positioning points is within the acceptable threshold range, the robotic arm calibration method is ended. In a step (S6), if a judging result of the step (S5) is not satisfied, a Jacobian matrix is generated according to the reached actual positioning point in each operation action of the robotic arm, and a position formula about the predicted positioning point and the actual positioning point in each operation action of the robotic arm is acquired, wherein the Jacobian matrix is a partial derivative of the function equation corresponding to a deviation amount $\Delta\alpha$ of a shaft size $\alpha$ of each axis of the robotic arm and a deviation amount $\Delta\theta$ of a rotation angle $\theta$ of each axis of the robotic arm in the corresponding operation action under the forward kinematics. In a step (S7), a subtraction is performed on the position formulae corresponding every two operation actions of the robotic arm, so that a difference between the deviation amounts $\Delta\alpha$ and a difference between the deviation amounts $\Delta\theta$ in every two operation actions are calculated. In a step (S8), the shaft size $\alpha$ of each axis and the rotation angle $\theta$ of each axis are updated according to the difference between the deviation amounts $\Delta\alpha$ and the difference between the deviation amounts $\Delta\theta$, and performing the step (S4) again.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
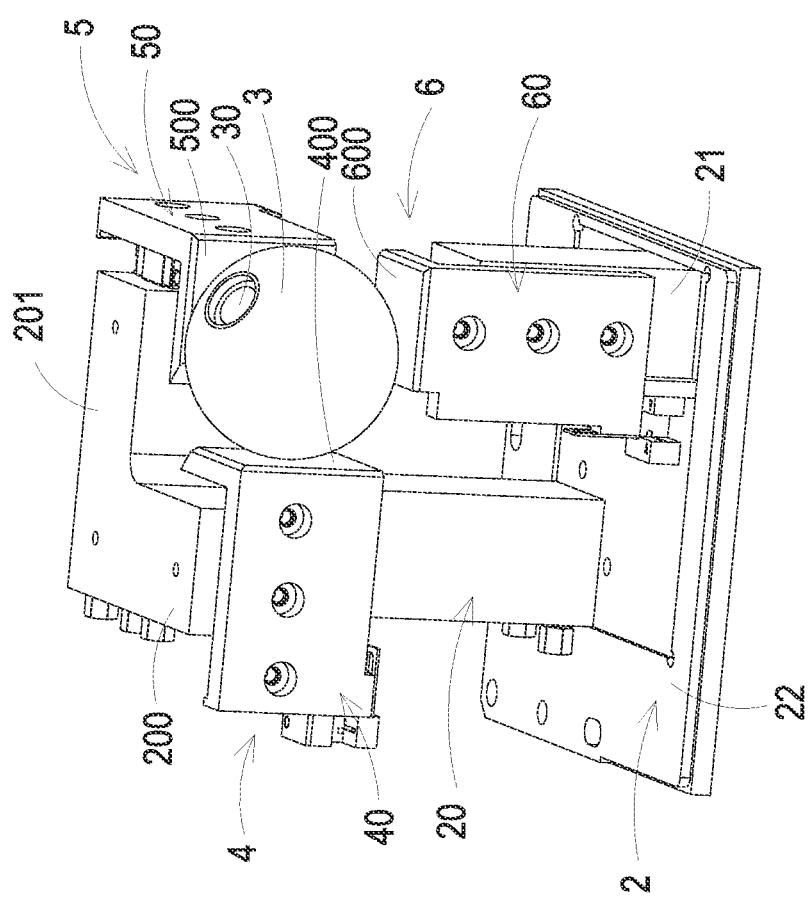
FIG. 1 is a schematic perspective view illustrating a three-dimensional measuring device according to an embodiment of the present disclosure and taken along a first viewpoint.
Figure 2:
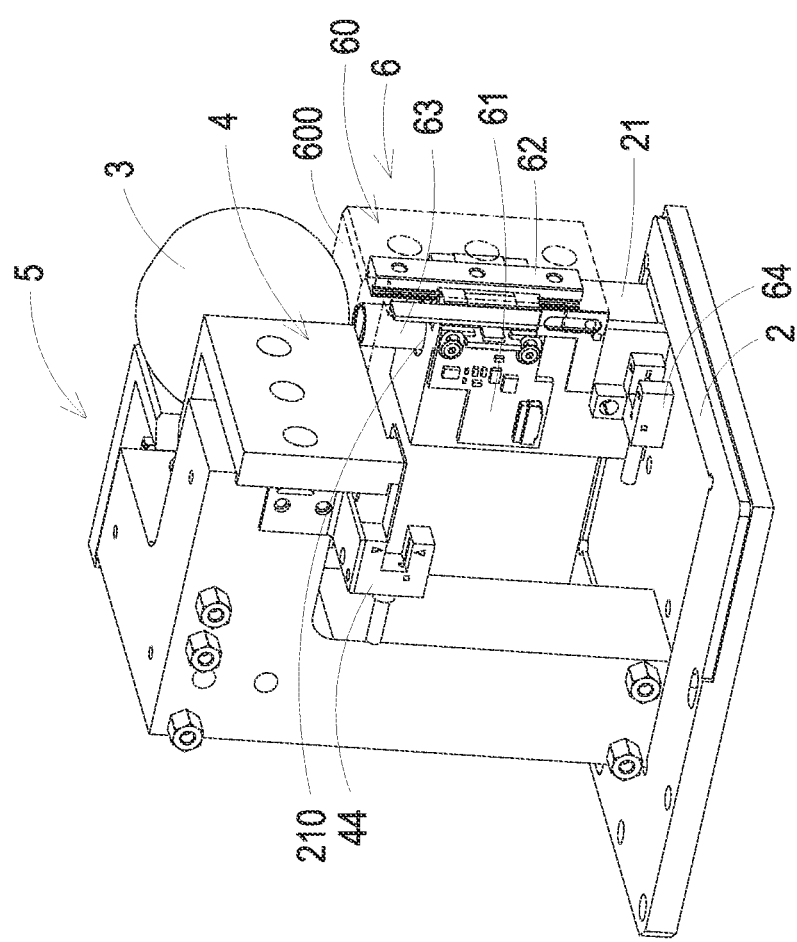
FIG. 2 is a schematic perspective view illustrating the three-dimensional measuring device as shown in FIG. 1 and taken along a second viewpoint.
Figure 3:
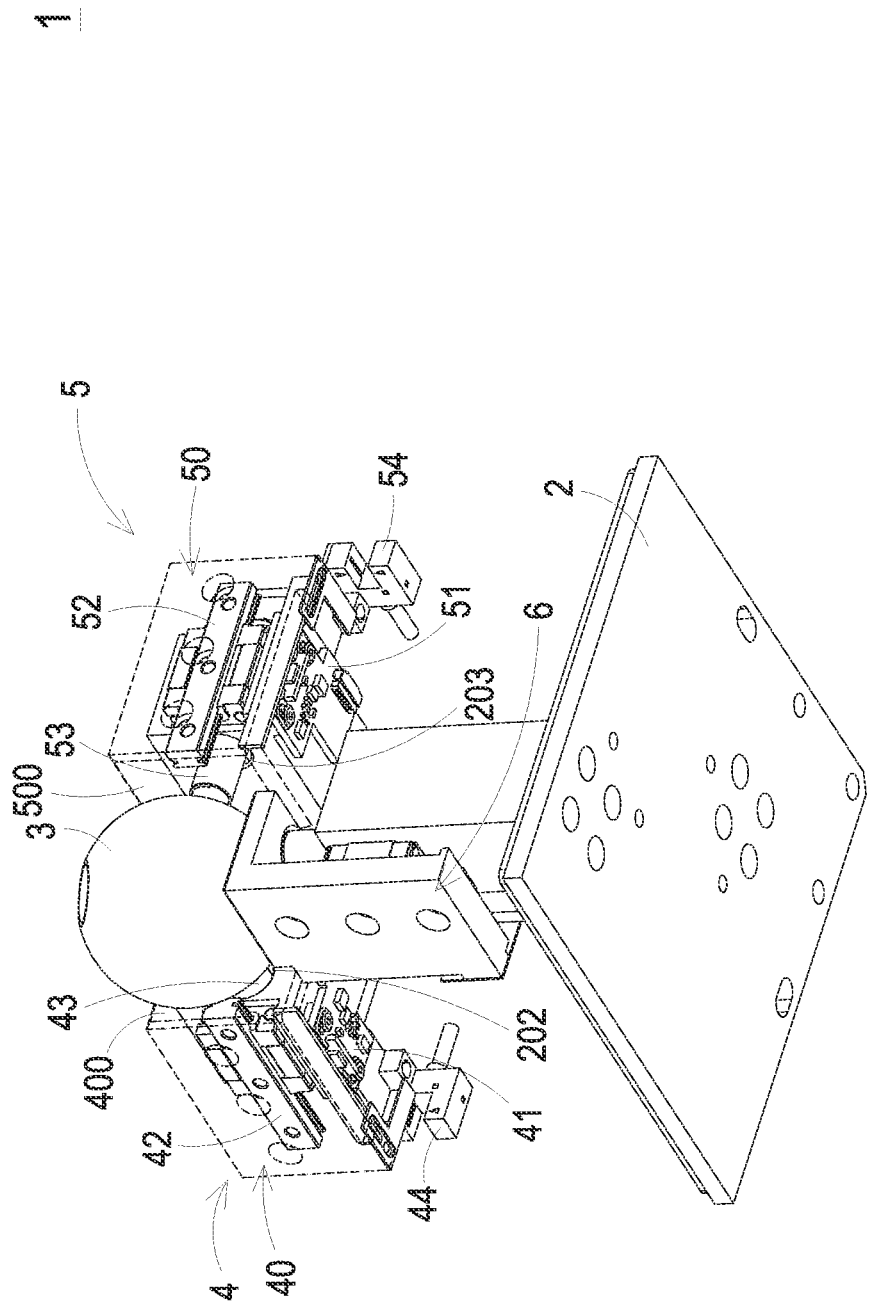
FIG. 3 is a schematic perspective view illustrating the three-dimensional measuring device as shown in FIG. 1 and taken along a third viewpoint.
Figure 4:
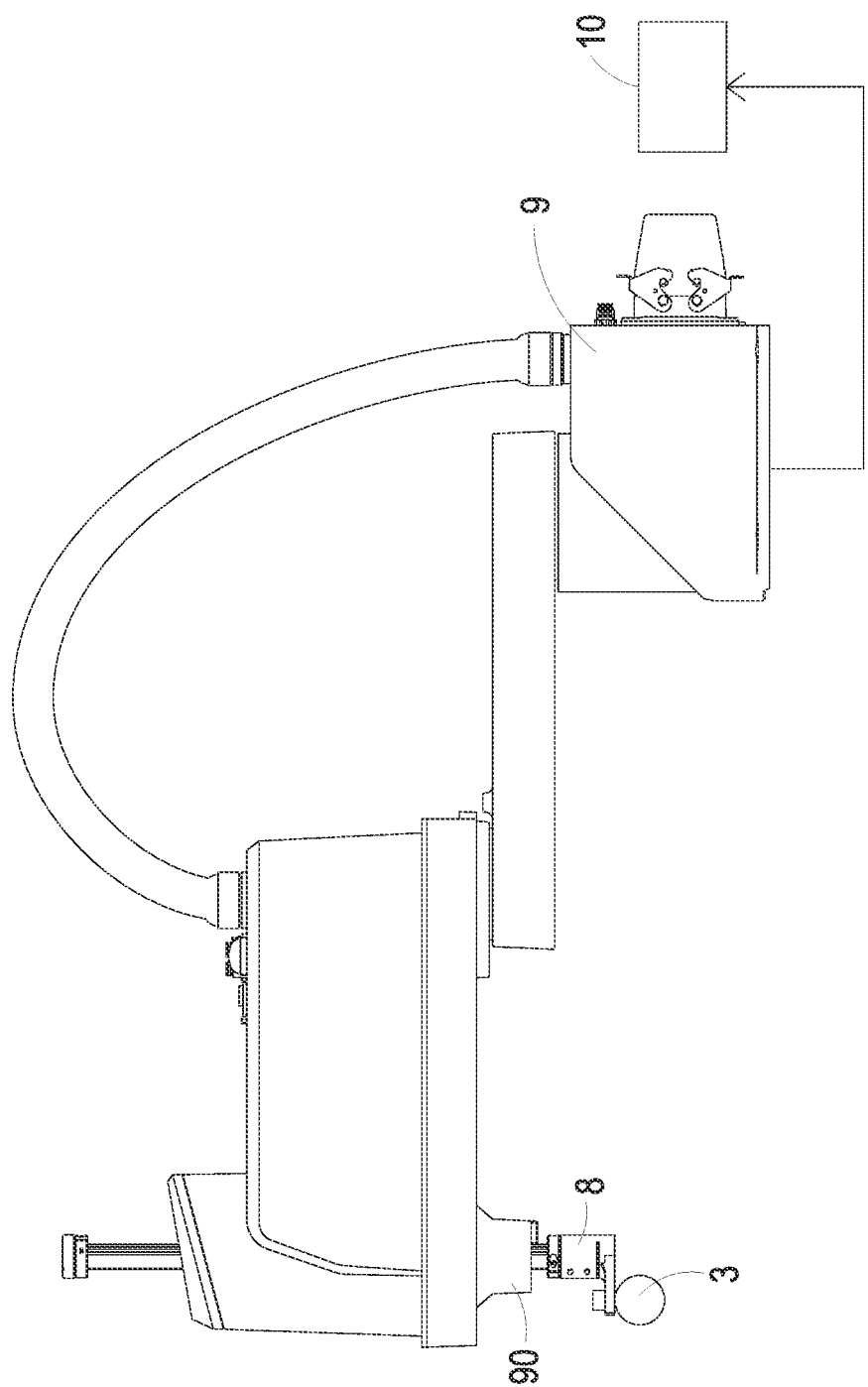
FIG. 4 schematically illustrates the application of the three-dimensional measuring device of FIG. 1 on a robotic arm.

Please refer to FIGS. 1, 2, 3 and 4. FIG. 1 is a schematic perspective view illustrating a three-dimensional measuring device according to an embodiment of the present disclosure and taken along a first viewpoint. FIG. 2 is a schematic perspective view illustrating the three-dimensional measuring device as shown in FIG. 1 and taken along a second viewpoint. FIG. 3 is a schematic perspective view illustrating the three-dimensional measuring device as shown in FIG. 1 and taken along a third viewpoint. FIG. 4 schematically illustrates the application of the three-dimensional measuring device of FIG. 1 on a robotic arm.

The three-dimensional measuring device 1 is used for measuring and acquiring the three-dimensional distance or the moving trajectory of a movable object of an automation device. For example, the three-dimensional measuring device 1 is used for measuring a robotic arm 9 of the automation device. The robotic arm 9 is a multi-axis robotic arm with more than three axes. Preferably but not exclusively, the robotic arm 9 is a selective compliance assembly robotic arm (SCARA) or a 6-axis robotic arm. The actions of the robotic arm 9 are controlled by a controller 10. For example, the controller 10 may control the robotic arm 9 to be moved in an X-axis direction, a Y-axis direction and/or a Z-axis direction. In case that the robotic arm 9 is a multi-axis robotic arm with more than four axes, the controller 10 can adjust the angle of the robotic arm 9. Moreover, the controller 10 can record the moved position point of the robotic arm 9. The controller 10 is in communication with the three-dimensional measuring device 1 in a wired transmission manner or a wireless transmission manner. Consequently, the controller 10 acquires the three-dimensional distance and/or the moving trajectory of the robotic arm 9.

In an embodiment, the three-dimensional measuring device 1 includes a base 2, a ball-shaped structure 3, an X-axis measuring module 4, a Y-axis measuring module 5 and a Z-axis measuring module 6. The base 2 includes a first fixing post 20 and a second fixing post 21. The first fixing post 20 and the second fixing post 21 are perpendicularly disposed on a top surface 22 of the base 2 and arranged beside each other. A first end of the first fixing post 20 is away from the top surface 22 of the base 2. A second end of the first fixing post 20 is close to the top surface 22 of the base 2. The first end of the first fixing post 20 includes a first connection part 200 and a second connection part 201. The second connection part 201 is connected with the first connection part 200. The first connection part 200 and the second connection part 201 are arranged in an L-shaped structure. In some embodiments, the first connection part 200 includes a first accommodation hole 202. The second connection part 201 includes a second accommodation hole 203. The second fixing post 21 includes a third accommodation hole 210.

The X-axis measuring module 4 is fixed on the first connection part 200 of the first fixing post 20. In an embodiment, the X-axis measuring module 4 includes a first measuring structure 40, a first position sensor 41, a first linear track 42 and a first elastic element 43. The first linear track 42 is disposed on the first connection part 200 along the X-axis direction. The first measuring structure 40 is movable along the X-axis direction. The first measuring structure 40 includes a first contacting part 400 and a sliding part (not shown). The sliding part of the first measuring structure 40 matches the first linear track 42. Consequently, the sliding part of the first measuring structure 40 can be slid relative to the first linear track 42. That is, the first measuring structure 40 can be slid on the first linear track 42 along the X-axis direction. The first position sensor 41 is aligned with the first measuring structure 40. The first position sensor 41 is in communication with the controller 10 in the wired transmission manner or the wireless transmission manner. The first position sensor 41 can measure and acquire the displacement amount of the first measuring structure 40 and transmit the measurement result to the controller 10. An example of the first position sensor 41 includes but is not limited to an optical rule. A first end of the first elastic element 43 is contacted with the first contacting part 400 of the first measuring structure 40. A second end of the first elastic element 43 is received within the first accommodation hole 202 of the first connection part 200 and contacted with an inner wall of the first accommodation hole 202. As the first measuring structure 40 is moved to exert a force on the first elastic element 43, the first elastic element 43 is compressed to generate an elastic restoring force. When the force is no longer exerted on the first elastic element 43, the first measuring structure 40 is returned to its original position in response to the elastic restoring force of the first elastic element 43.

The Y-axis measuring module 5 is fixed on the second connection part 201 of the first fixing post 20. In an embodiment, the Y-axis measuring module 5 includes a second measuring structure 50, a second position sensor 51, a second linear track 52 and a second elastic element 53. The second linear track 52 is disposed on the second connection part 201 along the Y-axis direction. The second measuring structure 50 is movable along the Y-axis direction. The second measuring structure 50 includes a second contacting part 500 and a sliding part (not shown). The sliding part of the second measuring structure 50 matches the second linear track 52. Consequently, the sliding part of the second measuring structure 50 can be slid relative to the second linear track 52. That is, the second measuring structure 50 can be slid on the second linear track 52 along the Y-axis direction. The second position sensor 51 is aligned with the second measuring structure 50. The second position sensor 51 is in communication with the controller 10 in the wired transmission manner or the wireless transmission manner. The second position sensor 51 can measure and acquire the displacement amount of the second measuring structure 50 and transmit the measurement result to the controller 10. An example of the second position sensor 51 includes but is not limited to an optical rule. A first end of the second elastic element 53 is contacted with the second contacting part 500 of the second measuring structure 50. A second end of the second elastic element 53 is received within the second accommodation hole 203 of the second connection part 201 and contacted with an inner wall of the second accommodation hole 203. As the second measuring structure 50 is moved to exert a force on the second elastic element 53, the second elastic element 53 is compressed to generate an elastic restoring force. When the force is no longer exerted on the second elastic element 53, the second measuring structure 50 is returned to its original position in response to the elastic restoring force of the second elastic element 53.

The Z-axis measuring module 6 is fixed on the second fixing post 21. In an embodiment, the Z-axis measuring module 6 includes a third measuring structure 60, a third position sensor 61, a third linear track 62 and a third elastic element 63. The third linear track 62 is disposed on the second fixing post 21 along the Z-axis direction. The third measuring structure 60 is movable along the Z-axis direction. The third measuring structure 60 includes a third contacting part 600 and a sliding part (not shown). The sliding part of the third measuring structure 60 matches the third linear track 62. Consequently, the sliding part of the third measuring structure 60 can be slid relative to the third linear track 62. That is, the third measuring structure 60 can be slid on the third linear track 62 along the Z-axis direction. The third position sensor 61 is aligned with the third measuring structure 60. The third position sensor 61 is in communication with the controller 10 in the wired transmission manner or the wireless transmission manner. The third position sensor 61 can measure and acquire the displacement amount of the third measuring structure 60 and transmit the measurement result to the controller 10. An example of the third position sensor 61 includes but is not limited to an optical rule. A first end of the third elastic element 63 is contacted with the third contacting part 600 of the third measuring structure 60. A second end of the third elastic element 63 is received within the third accommodation hole 210 of the second fixing post 21 and contacted with an inner wall of the third accommodation hole 210. As the third measuring structure 60 is moved to exert a force on the third elastic element 63, the third elastic element 63 is compressed to generate an elastic restoring force. When the force is no longer exerted on the third elastic element 63, the third measuring structure 60 is returned to its original position in response to the elastic restoring force of the third elastic element 63.

In an embodiment, the ball-shaped structure 3 is connected with a distal end of an end shaft 90 of the robotic arm 9 directly or indirectly. As shown in FIG. 4, the ball-shaped structure 3 is indirectly connected with the distal end of the end shaft 90 of the robotic arm 9 through a linkage 8. As the robotic arm 9 is moved, the ball-shaped structure 3 is synchronously moved along the three-dimensional directions and synchronously rotated at the specified angles. The displacement of the ball-shaped structure 3 indicates the displacement of the working point of the robotic arm 9. The three-dimensional coordinate of the center of the ball-shaped structure 3 indicates the three-dimensional position point of the robotic arm 9. The ball-shaped structure 3 is arranged among the X-axis measuring module 4, the Y-axis measuring module 5 and the Z-axis measuring module 6. Moreover, the ball-shaped structure 3 is contacted with the first contacting part 400 of the first measuring structure 40, the second contacting part 500 of the second measuring structure 50 and the third contacting part 600 of the third measuring structure 60. While the ball-shaped structure 3 is moved in at least one of the X-axis direction, the Y-axis direction and the Z-axis direction, the corresponding measuring structure is pushed by the ball-shaped structure 3. For example, if the ball-shaped structure 3 is moved in the X-axis direction to push the first contacting part 400, the first measuring structure 40 is moved. If the ball-shaped structure 3 is moved in the Y-axis direction to push the second contacting part 500, the second measuring structure 50 is moved. If the ball-shaped structure 3 is moved in the Z-axis direction to push the third contacting part 600, the third measuring structure 60 is moved. After the first position sensor 41 measures the displacement amount of the first measuring structure 40, the second position sensor 51 measures the displacement amount of the second measuring structure 50 and the third position sensor 61 measures the displacement amount of the third measuring structure 60, the sensed results are transmitted to the controller 10. After the controller 10 acquires the three-dimensional coordinate and the displacement of the ball-shaped structure 3, the controller 10 acquires the three-dimensional coordinate and the displacement of the working point of the end shaft 90 of the robotic arm 9. Consequently, the operating condition of the robotic arm 9 is calculated, and the corresponding control and/or calibration is performed.

Figure 5:
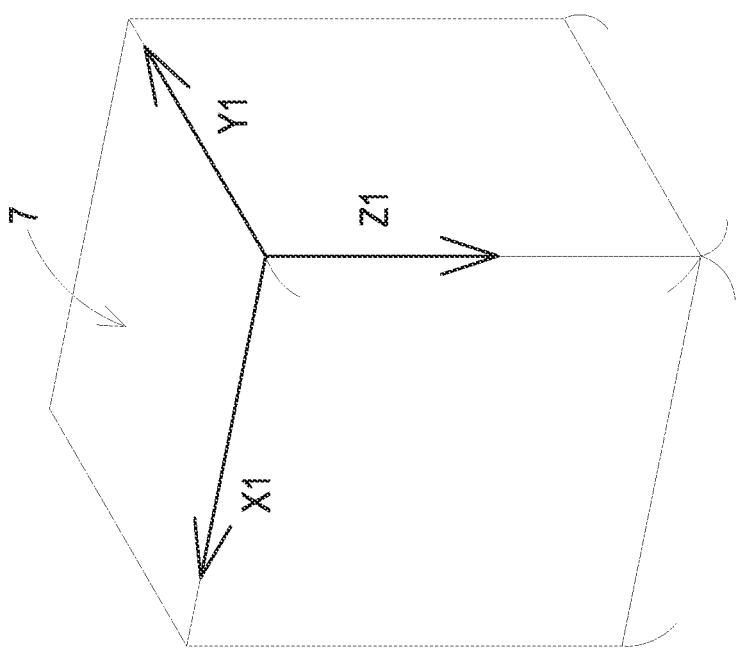
FIG. 5 schematically illustrates a measuring space of the three-dimensional measuring device according to the embodiment of the present disclosure, wherein the measuring space is defined by the movable distance range of the first measuring structure along the X-axis direction, the movable distance range of the second measuring structure along the Y-axis direction and the movable distance range of the third measuring structure along the Z-axis direction.

FIG. 5 schematically illustrates a measuring space of the three-dimensional measuring device according to the embodiment of the present disclosure, wherein the measuring space is defined by the movable distance range of the first measuring structure along the X-axis direction, the movable distance range of the second measuring structure along the Y-axis direction and the movable distance range of the third measuring structure along the Z-axis direction. As mentioned above, the movement of the ball-shaped structure 3 is driven by the robotic arm 9, and the ball-shaped structure 3 is contacted with the first contacting part 400 of the first measuring structure 40, the second contacting part 500 of the second measuring structure 50 and the third contacting part 600 of the third measuring structure 60. Consequently, a rectangular measuring space 7 is defined by the movable distance range X1 of the first measuring structure 40 along the X-axis direction, the movable distance range Y1 of the second measuring structure 50 along the Y-axis direction and the movable distance range Z1 of the third measuring structure 60 along the Z-axis direction. While the ball-shaped structure 3 is moved in the measuring space 7, the sensed results of the first position sensor 41, the second position sensor 51 and the third position sensor 61 reflect the three-dimensional displacement of the ball-shaped structure 3 and the three-dimensional coordinate of the ball-shaped structure 3. Consequently, the three-dimensional position point of the robotic arm 9 is acquired. In case that the position of the origin is defined in the measuring space 7, the three-dimensional coordinate of the ball-shaped structure 3 that is sensed by the first position sensor 41, the second position sensor 51 and the third position sensor 61 is the absolute coordinate. Preferably, each of the movable distance range X1 of the first measuring structure 40 along the X-axis direction, the movable distance range Y1 of the second measuring structure 50 along the Y-axis direction and the movable distance range Z1 of the third measuring structure 60 along the Z-axis direction is equal to the radius of the ball-shaped structure 3. Consequently, while the ball-shaped structure 3 is moved in the measuring space 7, the ball-shaped structure 3 is contacted with the first contacting part 400 of the first measuring structure 40, the second contacting part 500 of the second measuring structure 50 and the third contacting part 600 of the third measuring structure 60.

In an embodiment, the X-axis measuring module 4 further includes a first proximity sensor 44 corresponding to the first measuring structure 40. When the first measuring structure 40 is within the sensing range of the first proximity sensor 44, the first proximity sensor 44 issues a prompt signal to the controller 10. Due to the arrangement of the first proximity sensor 44, the controller 10 takes a corresponding action when the first measuring structure 40 is moved to the limit position. Similarly, the Y-axis measuring module 5 further includes a second proximity sensor 54 corresponding to the second measuring structure 50. When the second measuring structure 50 is within the sensing range of the second proximity sensor 54, the second proximity sensor 54 issues a prompt signal to the controller 10. Due to the arrangement of the second proximity sensor 54, the controller 10 takes a corresponding action when the second measuring structure 50 is moved to the limit position. Similarly, the Z-axis measuring module 6 further includes a third proximity sensor 64 corresponding to the third measuring structure 60. When the third measuring structure 60 is within the sensing range of the third proximity sensor 64, the third proximity sensor 64 issues a prompt signal to the controller 10. Due to the arrangement of the third proximity sensor 64, the controller 10 takes a corresponding action when the third measuring structure 60 is moved to the limit position.

In an embodiment, the ball-shaped structure 3 further includes a fastening hole 30. The fastening hole 30 is concavely formed on the surface of the ball-shaped structure 3. The inner wall of the fastening hole 30 has an inner thread structure (not shown). Consequently, the ball-shaped structure 3 can be assembled with the linkage 8 through the fastening hole 30 or assembled with the distal end of the end shaft 90 of the robotic arm 9 through the fastening hole 30.

Figure 6:
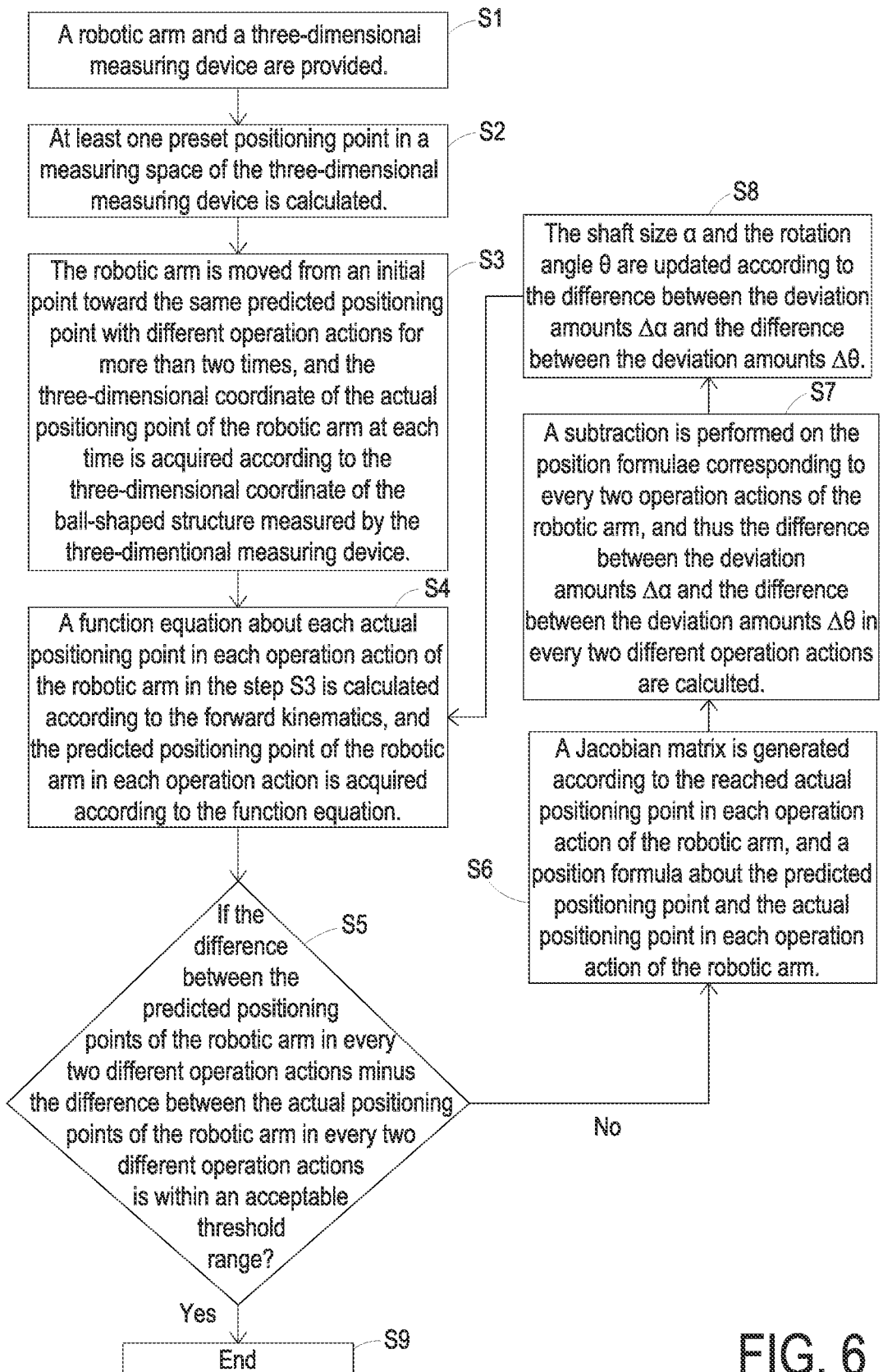
FIG. 6 is a flowchart illustrating a robotic arm calibration method for the three-dimensional measuring device of the present disclosure.

FIG. 6 is a flowchart illustrating a robotic arm calibration method for the three-dimensional measuring device of the present disclosure. Since the three-dimensional coordinate of the center of the ball-shaped structure 3 is correlated to the actual point of the working point of the robotic arm 9, the actual point of the working point of the robotic arm 9 is acquired according to the three-dimensional coordinate of the center of the ball-shaped structure 3. The robotic arm calibration method is applied to the controller 10 of the robotic arm 9. The operating principles of the robotic arm calibration method will be described as follows.

In the robot kinematics analysis, the forward kinematics of the existing technology can be used to establish a mathematical model based on the arm length of each axis of the robotic arm 9 and the rotation angle of each axis of the robotic arm 9 in order to estimate the position of the working point of the robotic arm 9 (i.e., to predict the coordinate of the positioning point). If the robotic arm 9 is moved toward the same preset positioning point with different operation actions, the predicted positioning point of the robotic arm 9 in the space can be estimated directly by using a mathematical model according to the rotation angle of each axis of the robotic arm 9. According to the ideal mathematical model of the robotic arm 9, the function equation FK(θi) about the rotation angle θ of each axis of the robotic arm 9 in each operation action under the forward kinematics can be used to calculate the predicted positioning point $\hat{P}$ of the robotic arm 9 in the space. The predicted positioning point $\hat{P}$ can be expressed by the mathematic formula (1):

$$\hat{P}_i = \widehat{FK}(\theta_i) \quad (1);$$

In the above mathematic formula, $\hat{P}$ is the predicted positioning point of the working point of the robotic arm 9 under the forward kinematics, i is the i-th operation action executed by the robotic arm 9, and $\widehat{FK}(\theta_i)$ is the function equation FK(θi) about the rotation angle θ of each axis of the robotic arm 9 in each operation action under the forward kinematics.

Ideally, the controller 10 has the following settings about the command of the preset positioning point. If the robotic arm 9 is moved toward the same preset positioning point with more than two different operation actions, the difference between the predicted positioning points $\hat{P}$ of the robotic arm 9 in every two different operation actions minus the difference between the actual positioning points P of the robotic arm 9 in every two different operation actions is equal to zero. That is, $(\hat{P}_{i+1}-\hat{P}_i)-(P_{i+1}-P_i)$ is equal to 0. However, because of the production errors and the assembling errors, the controller 10 has the following settings about the command of the preset positioning point. For example, if the robotic arm 9 is moved toward the same preset positioning point with more than two different operation actions (or gestures), there is a position deviation between the actual positioning points of the robotic arm 9 in every two different operation actions. That is, the robotic arm 9 is not moved toward the same actual position. If the above situation occurs, $(\hat{P}_{i+1}-\hat{P}_i)-(P_{i+1}-P_i)$ is not equal to 0. In accordance with the robotic arm calibration method of the present disclosure, the controller 10 performs the calibration on the robotic arm 9 when $(\hat{P}_{i+1}-\hat{P}_i)-(P_{i+1}-P_i)$ is not within the acceptable threshold range.

For performing the calibration, the existing technology is used to generate a Jacobian matrix according to the actual positioning point of the robotic arm 9 in each operation action. Consequently, the relationship between the predicted positioning point $\hat{P}$ and the actual positioning point P may be expressed by the position formula (2):

$$P_i = \hat{P}_i + J_i[\Delta\alpha, \Delta\theta] = \widehat{FK}(\theta_i) + J_i[\Delta\alpha, \Delta\theta] \quad (2)$$

In the above mathematic formula, J is a Jacobian matrix, Ji|Δα,Δθ| is the first partial derivative of the function equation $\widehat{FK}(\theta_i)$ corresponding to the deviation amount Δα of the shaft size α of each axis of the robotic arm 9 and the deviation amount Δθ of the rotation angle θ of each axis of the robotic arm 9 in the i-th operation action under the forward kinematics.

Then, according to the mathematic formula (2), a subtraction is performed on the position formula of the (i+1)-th operation action and the position formula of the i-th operation action. Consequently, the mathematic formula (3) is acquired.

$$(P_{i+1}-P_i)-\{\widehat{FK}(\theta_{i+1})-\widehat{FK}(\theta_i)\}=(J_{i+1}-J_i)[\Delta\alpha,\Delta\theta] \quad (3);$$

In the mathematic formula (3), $P_{i+1}$ and $P_i$ are the three-dimensional coordinates of the actual positioning points that are measured by the three-dimensional measuring device 1.

Consequently, according to the sensed results of the three-dimensional measuring device 1, the controller 10 acquires the value of $(P_{i+1}-P_i)$ (i.e., the difference between the actual positioning points P of the robotic arm 9 in every two different operation actions). Since $\widehat{FK}(\theta_{i+1})$ and $\widehat{FK}(\theta_i)$ are known values according to the ideal mathematic model of the robotic arm 9, the relationship between $(P_{i+1}-P_i)$ and $(J_{i+1}-J_i)[\Delta\alpha,\Delta\theta]$ can be realized.

If the value of $(P_{i+1}-P_i)$ is close to 0 through the calibration of the robotic arm 9, the actual positioning points of the robotic arm 9 are nearly identical when the robotic arm 9 is moved toward the same preset positioning point with more than two different operation actions. According to the mathematic formula (3), the controller 10 calculates the difference between the deviation amounts Δα and the difference between the deviation amounts Δθ in every two different operation actions. According to the difference between the deviation amounts Δα and the difference between the deviation amounts Δθ, the shaft size α of each axis and the rotation angle θ of each axis obtained according to the ideal mathematic model of the robotic arm 9 under the forward kinematics are updated. That is, the shaft size α of each axis and the rotation angle θ of each axis in the corresponding function equation are updated. Consequently, the value of $(P_{i+1}-P_i)$ is gradually converged to 0. In such way, the calibration of the robotic arm 9 is completed.

Please refer to the flowchart of FIG. 6. The robotic arm calibration method includes the following steps.

Firstly, in a step S1, a robotic arm (e.g., the robotic arm 9 as shown in FIG. 4) and a three-dimensional measuring device 1 as shown in FIG. 1 are provided. The ball-shaped structure 3 is connected with an end shaft 90 of the robotic arm 9, and located at an initial point.

In a step S2, at least one preset positioning point in a measuring space 7 of the three-dimensional measuring device 1 is calculated. The measuring space 7 is defined by the movable distance range X1 of the first measuring structure 40 along the X-axis direction, the movable distance range Y1 of the second measuring structure 50 along the Y-axis direction and the movable distance range Z1 of the third measuring structure 60 along the Z-axis direction.

In a step S3, the robotic arm 9 is moved from the initial point toward the same preset positioning point with different operation actions for more than two times, the three-dimensional coordinate of the actual positioning point of the robotic arm 9 at each time is acquired according to the three-dimensional coordinate of the ball-shaped structure 3 measured by the three-dimensional measuring device 1.

In a step S4, a function equation about each actual positioning point in each operation action of the robotic arm 9 in the step S3 (i.e., the mathematic formula (1)) is calculated according to the forward kinematics, and the predicted positioning point of the robotic arm 9 in each operation action is acquired according to the function equation.

Then a step S5 is performed to judge whether the difference between the predicted positioning points $\hat{P}$ of the robotic arm 9 in every two different operation actions minus the difference between the actual positioning points P of the robotic arm 9 in every two different operation actions (i.e., $(\hat{P}_{i+1}-\hat{P}_i)-(P_{i+1}-P_i)$) is within an acceptable threshold range.

If the judging result of the step S5 is not satisfied, a step S6 is performed. In the step S6, a Jacobian matrix is generated according to the reached actual positioning point in each operation action of the robotic arm 9, and a position formula about the predicted positioning point and the actual positioning point in each operation action of the robotic arm 9 (i.e., the mathematic formula (2)) is acquired. The Jacobian matrix is a partial derivative of the function equation corresponding to the deviation amount $\Delta\alpha$ of the shaft size $\alpha$ of each axis of the robotic arm 9 and the deviation amount $\Delta\theta$ of the rotation angle $\theta$ of each axis of the robotic arm 9 in the corresponding operation action under the forward kinematics.

After the step S6, a step S7 is performed. In the step S7, a subtraction is performed on the position formulae corresponding to every two operation actions of the robotic arm 9. Consequently, the difference between the deviation amounts $\Delta\alpha$ and the difference between the deviation amounts $\Delta\theta$ in every two different operation actions are calculated.

After the step S7, a step S8 is performed. In the step S8, the shaft size $\alpha$ of each axis and the rotation angle $\theta$ of each axis obtained according to the ideal mathematic model of the robotic arm 9 under the forward kinematics are updated according to the difference between the deviation amounts $\Delta\alpha$ and the difference between the deviation amounts $\Delta\theta$.

After the step S8, the step S4 is repeatedly done. If the judging result of the step S5 is satisfied, a step S9 is performed. Meanwhile, the robotic armor calibration method is ended.

From the above descriptions, the present disclosure provides a three-dimensional measuring device and a robotic arm calibration method thereof. The three-dimensional measuring device includes a ball-shaped structure, an X-axis measuring module, a Y-axis measuring module and a Z-axis measuring module. The ball-shaped structure is contacted with the X-axis measuring module, the Y-axis measuring module and the Z-axis measuring module and assembled with a movable object. Consequently, the three-dimensional measuring device can measure the three-dimensional coordinate of the ball-shaped structure to acquire the working point of the movable object. The use of the three-dimensional measuring device can save the measuring period and reduce the fabricating cost. Moreover, the robotic arm calibration method is implemented by the three-dimensional measuring device of the present disclosure and has the time-saving and cost-effective efficacy.

What is claimed is:

1. A robotic arm calibration method, the method applied to a robotic arm and comprising steps of:
   (S1) providing a three-dimensional measuring device, wherein the three-dimensional measuring device comprises a ball-shaped structure, a base, an X-axis measuring module, a Y-axis measuring module and a Z-axis measuring module, wherein the ball-shaped structure is assembled with the robotic arm, the ball-shaped structure is moved and/or rotated in response to a movement of the robotic arm, the X-axis measuring module is disposed on the base and comprises a first measuring structure and a first position sensor, the first measuring structure is movable along an X-axis direction and contacted with the ball-shaped structure, and the first position sensor measures a displacement amount of the first measuring structure when the first measuring structure is pushed by the ball-shaped structure, wherein the Y-axis measuring module is disposed on the base and comprises a second measuring structure and a second position sensor, the second measuring structure is movable along a Y-axis direction and contacted with the ball-shaped structure, and the second position sensor measures a displacement amount of the second measuring structure when the second measuring structure is pushed by the ball-shaped structure, wherein the Z-axis measuring module is disposed on the base and comprises a third measuring structure and a third position sensor, the third measuring structure is movable along a Z-axis direction and contacted with the ball-shaped structure, and the third position sensor measures a displacement amount of the third measuring structure when the third measuring structure is pushed by the ball-shaped structure, wherein a measuring space is defined by a movable distance range of the first measuring structure along the X-axis direction, a movable distance range of the second measuring structure along the Y-axis direction and a movable distance range of the third measuring structure along the Z-axis direction, wherein when the ball-shaped structure is moved in the measuring space, a three-dimensional coordinate of the ball-shaped structure is obtained according to sensed results of the first position sensor, the second position sensor and the third position sensor;
   (S2) calculating at least one preset positioning point in the measuring space;
   (S3) controlling the robotic arm to be moved from an initial point toward the same preset positioning point with different operation actions for more than two times, and acquiring a three-dimensional coordinate of each actual positioning point of the robotic arm at each time according to the three-dimensional coordinate of the ball-shaped structure measured by the three-dimensional measuring device;
   (S4) calculating a function equation about each actual positioning point in each operation action of the robotic arm in the step (S3) according to the forward kinematics, and acquiring a predicted positioning point of the robotic arm in each operation action according to the function equation;
   (S5) judging whether a difference between the predicted positioning points of the robotic arm in every two different operation actions minus a difference between the actual positioning points of the robotic arm in every two different operation actions is within an acceptable threshold range; if the difference between the two predicted positioning points minus the difference between the two actual positioning points is within the acceptable threshold range, the robotic arm calibration method is ended;
   (S6) if a judging result of the step (S5) is not satisfied, generating a Jacobian matrix according to the reached actual positioning point in each operation action of the robotic arm, and acquiring a position formula about the predicted positioning point and the actual positioning point in each operation action of the robotic arm, wherein the Jacobian matrix is a partial derivative of the function equation corresponding to a deviation amount $\Delta\alpha$ of a shaft size $\alpha$ of each axis of the robotic arm and a deviation amount $\Delta\theta$ of a rotation angle $\theta$ of each axis of the robotic arm in the corresponding operation action under the forward kinematics;
   (S7) performing a subtraction on the position formulae corresponding every two operation actions of the robotic arm, so that a difference between the deviation amounts $\Delta\alpha$ and a difference between the deviation amounts $\Delta\theta$ in every two operation actions are calculated; and
   (S8) updating the shaft size $\alpha$ of each axis and the rotation angle $\theta$ of each axis according to the difference between the deviation amounts Δα and the difference between the deviation amounts Δθ, and performing the step (S4) again.

2. The robotic arm calibration method according to claim 1, wherein the actual positioning point is a three-dimensional coordinate of a center of the ball-shaped structure.

3. The robotic arm calibration method according to claim 1, wherein the ball-shaped structure is connected with an end shaft of the robotic arm.

4. The robotic arm calibration method according to claim 1, wherein the preset positioning point is a three-dimensional coordinate of the ball-shaped structure in the measuring space.

* * * * *